US012370800B2

(12) United States Patent
de Groot

(10) Patent No.: US 12,370,800 B2
(45) Date of Patent: Jul. 29, 2025

(54) ADD-ON MODULE FOR A DISPOSABLE PRINTER CARTRIDGE AND A PRINTER

(71) Applicant: Mevam BV, Noordwijk (NL)

(72) Inventor: Meindert de Groot, Noordwijk (NL)

(73) Assignee: Mevam BV, Noordwijk (NL)

( * ) Notice: Subject to any disclaimer, the term of this patent is extended or adjusted under 35 U.S.C. 154(b) by 0 days.

(21) Appl. No.: 18/488,712

(22) Filed: Oct. 17, 2023

(65) Prior Publication Data

US 2024/0042764 A1 Feb. 8, 2024

Related U.S. Application Data

(63) Continuation of application No. 17/110,986, filed on Dec. 3, 2020, now Pat. No. 11,833,826, which is a continuation of application No. PCT/NL2019/050325, filed on Jun. 4, 2019.

(30) Foreign Application Priority Data

Jun. 4, 2018 (NL) ..................................... 2021052

(51) Int. Cl.
*B41J 2/165* (2006.01)

(52) U.S. Cl.
CPC ....... *B41J 2/16547* (2013.01); *B41J 2/16508* (2013.01); *B41J 2/16511* (2013.01); *B41J 2202/20* (2013.01)

(58) Field of Classification Search
None
See application file for complete search history.

(56) References Cited

U.S. PATENT DOCUMENTS

| | | | | |
|---|---|---|---|---|
| 5,587,729 | A | 12/1996 | Lee et al. | |
| 5,682,186 | A * | 10/1997 | Bohorquez | B41J 2/16505 347/29 |
| 5,798,777 | A | 8/1998 | Yoshimura et al. | |
| 6,015,211 | A * | 1/2000 | Kinoshita | B41J 3/36 347/109 |
| 7,461,919 | B2 | 12/2008 | Silverbrook et al. | |
| 7,883,173 | B1 * | 2/2011 | Tratar | B41J 2/16547 347/22 |
| 8,337,002 | B2 | 12/2012 | Akiyama et al. | |
| 8,936,346 | B2 * | 1/2015 | Kawakami | B41J 2/16505 347/29 |
| 9,221,261 | B2 | 12/2015 | Love et al. | |
| 9,223,541 | B2 | 12/2015 | Barakat | |
| 2006/0119657 | A1 | 6/2006 | Berry et al. | |
| 2013/0229469 | A1 * | 9/2013 | Nozawa | B41J 2/17553 347/86 |

(Continued)

FOREIGN PATENT DOCUMENTS

WO 2019/235916 12/2019

*Primary Examiner* — Alejandro Valencia
(74) *Attorney, Agent, or Firm* — Peacock Law P.C.; Justin R. Jackson; Daniel Berenger-Russell

(57) ABSTRACT

Add-on module suitable to receive and hold a disposable printer cartridge that is provided with inkjet nozzles, which disposable printer cartridge is equipped for placement in a printer, and wherein the add-on module is a disposable and independent item without forming a constructional part of the printer, and wherein the add-on module comprises at least one of capping means and wiping means that are arranged for capping and wiping respectively of said inkjet nozzles of the printer cartridge.

17 Claims, 1 Drawing Sheet

(56) References Cited

U.S. PATENT DOCUMENTS

| | | | |
|---|---|---|---|
| 2014/0118438 | A1 | 5/2014 | Wall et al. |
| 2017/0173959 | A1 | 6/2017 | Mueller et al. |
| 2017/0282567 | A1 | 10/2017 | Campillo et al. |
| 2021/0086516 | A1 | 3/2021 | De Groot |

* cited by examiner

ADD-ON MODULE FOR A DISPOSABLE PRINTER CARTRIDGE AND A PRINTER

CROSS-REFERENCE TO RELATED APPLICATIONS

This application is a continuation of U.S. patent application Ser. No. 17/110,986, titled "ADD-ON MODULE FOR A DISPOSABLE PRINTER CARTRIDGE AND A PRINTER", filed on Dec. 3, 2020, which itself is a continuation of PCT/NL2019/050325, titled "ADD-ON MODULE FOR A DISPOSABLE PRINTER CARTRIDGE AND A PRINTER", filed on Jun. 4, 2019, which claims priority to Netherlands Patent Application No. 2021052, titled "ADD-ON MODULE FOR A DISPOSABLE PRINTER CARTRIDGE AND A PRINTER", filed on Jun. 4, 2018, and the specification and claims thereof are incorporated herein by reference.

BACKGROUND OF THE INVENTION

Field of the Invention

Embodiments of the present invention relate to an add-on module suitable to receive and hold a disposable printer cartridge that is provided with inkjet nozzles, which disposable printer cartridge is equipped for placement in a printer, wherein the printer cartridge is equipped to make prints on nonporous substrates.

In order to make a print adhere onto a non-porous substrate (like glass, metal, plastics etc.) inks/colouring agents need to be used that are suspended in Volatile Organic Compounds (VOC's). After printing with the inkjet nozzles, the VOC's will be exposed to the ambient, which makes them evaporate. Once the VOC's have evaporated the ink/colouring agent will be left behind on the nonporous substrate causing the print to adhere onto it.

The quicker the VOC's evaporate, also the quicker the ink will dry on the substrate. The problem is that this same effect also happens inside the nozzles of the inkjet cartridge's printhead. As the nozzles are open, the ink in the nozzles is exposed to the ambient and the VOC's evaporate. As a result when the printer is idle, the ink also dries and solidifies in the nozzles.

The problem of undesirable evaporation of the VOCs from the ink in the nozzles does not occur with continuous printing as the ink is jetted out of the nozzles and immediately replaced by new ink before the VOC's get time to evaporate. But with particular inks that dry within seconds even the smallest printing pause can cause the nozzles to become (partially) obstructed.

The problem is therefore that the quicker the VOC's evaporate, not only the print dries quicker on the substrate, but also the quicker the nozzles become obstructed when printing is interrupted. This may result in missed dots in a first print when printing is resumed after an interruption of printing, or even complete obstruction of the nozzles when the inkjet nozzles are left exposed/idle for too long a time. In order to resume printing without flaws, then depending on the extent to which the ink has already dried in the nozzles, the nozzles will need to be flushed (called purging or spitting) and wiped (in order to clean off access ink or dirt). In the worst case it may even be necessary that the whole cartridge must be replaced in case the nozzles are obstructed beyond recovery. This results not only in a complete waste of ink that is left in the cartridge, but also causes expensive production downtime.

The above-mentioned purging or spitting is basically an action to let each nozzle splash within a fixed time interval a little amount of ink in the air to remove the dried ink from the nozzles. According to the speed at which the ink dries, the shorter also the interval can or must be between each spit/print. By the spitting or purging it is prevented that the first print after resuming printing following a period of time in which printing has been interrupted, will miss dots due to one (or more) obstructed nozzle(s). Basically with the technique of purging or spitting all nozzles are blown clear of dried ink just before printing is resumed. So the shorter period of time in which the spit is performed in advance of printing, the bigger the chance that the first print is perfect without missing any dots. This also means that even when the printhead nozzles have been capped, it may still be advisable to perform a spit after de-capping and immediately before printing is resumed to assure that all nozzles will be open.

Embodiments of the present invention provide a simple solution for the above-mentioned problems and objectives.

Background Art

U.S. Pat. No. 7,461,919 discloses an inkjet printhead assembly having a casing removably mounting at least one printhead module which has an elongate support member longitudinally supporting a plurality of printhead integrated circuits and a capping member capping one longitudinal end of the elongate support member. The support member has a plurality of longitudinally extending channels for carrying and delivering ink to inkjet nozzles of the printhead integrated circuits. The longitudinal ends of the elongate support member are configured differently and complementarily to one another. The capping member is configured to cap either of the longitudinal ends so as to seal the channels.

U.S. Pat. No. 9,221,261 discloses a printer having an inkjet printhead assembly; a sled slidably arranged with respect to the printhead assembly, the sled supporting a platen module, a capper module and a wiper module; a sliding mechanism for sliding the sled relative to printhead assembly so as to selectively align one of the platen, capper and wiper modules with the printhead assembly; and a lift mechanism for lifting an aligned module linearly away from the sled and towards the printhead assembly. The platen module is positioned between the capper and wiper modules on the sled, such that the capper and wiper modules are positioned at opposite sides of the printhead assembly during printing.

Printers that do not operate with disposable printer cartridges and that are accordingly distant from the invention which relates to disposable printer cartridges, are known from US2006/119657; U.S. Pat. No. 9,233,541; and US2017/173959.

US2014/0118438 discloses a capping device for an ink jet print head, which device includes a base, the base configured to receive an ink jet print head comprising nozzles for ejecting ink in a print direction, and a cap assembly attached to the base and configured for movement between a closed position when the print head is not printing and an open position to allow for the ejection of ink from the nozzles when the print head is printing. The capping system provides a floating cover that provides a rigid surface to contact and seal the nozzle array when the printer is not printing. The cap assembly thus covers the nozzle array when the printer is not printing to prevent the nozzles from drying out. In one embodiment, the system includes a wiper mechanism for wiping the surface of the nozzle array or an area of the print head adjacent the nozzles. The wiper is disposed at a distal end of the cap (i.e. at the end opposite the cover support). The wiper includes an extension and a tip. The tip is configured to wipe the surface of the nozzle array to remove ink, debris and generally clean the nozzle array, when the cover is moved open and closed. The wiper is preferably made from a stiff elastomeric material.

Note that this application refers to a number of publications. Discussion of such publications herein is given for more complete background and is not to be construed as an admission that such publications are prior art for patentability determination purposes.

BRIEF SUMMARY OF THE INVENTION

According to an embodiment of the present invention, an add-on module is suitable to receive and hold a disposable printer cartridge that is provided with inkjet nozzles, which disposable printer cartridge is equipped for placement in a printer, wherein the add-on module is a disposable and independent item without forming a constructional part of the printer, and wherein the add-on module comprises capping means and wiping means that are arranged for capping and wiping respectively of said inkjet nozzles of the printer cartridge, wherein the capping means and the wiping means are provided on movable doors that are mounted on the frame, and wherein the capping means comprise a nozzle seal embodied as a silicone cap, mounted on the door supporting the capping means, and the wiping means comprise a waste ink collector embodied as a sponge, mounted on the door supporting the wiping means.

The disposable add-on module of the invention can cost-effectively be used with existing disposable printer cartridges that thereafter need no further modification for this purpose.

As mentioned, the disposable add-on module of the invention comprises both capping means and wiping means. This provides a huge advantage over the prior art wherein it are the printers that have capping and wiping means. In the disposable add-on module of the invention the wiping means are only required to have a capacity to absorb excess ink sufficient for the lifetime of only a single disposable printer cartridge. When this printer cartridge is exhausted the add-on module can be disposed together with the printer cartridge, and a new printer cartridge assembled with a fresh add-on module according to the invention can be placed into the printer. The quality of operation of the printer benefits tremendously herefrom.

The invention also relates to a printer equipped to receive such a disposable printer cartridge that is provided with inkjet nozzles, wherein according to the invention the printer is further equipped to receive and house an assembly of such a disposable printer cartridge provided with the disposable add-on module of the invention.

Suitably the add-on module comprises a frame which is capable to receive the disposable printer cartridge.

When the add-on module has received the disposable printer cartridge and is thus assembled together with the disposable printer cartridge, desirably the frame still leaves room for reciprocating movement of the disposable printer cartridge in the frame of the add-on module.

The reciprocating movement of the disposable printer cartridge in the frame of the add-on module corresponds to a preferable feature of the printer of the invention being that the printer has an actuator operative on the disposable printer cartridge received in the printer for moving the printer cartridge in the frame of the add-on module. The benefit of this feature is in particular achieved with a preferred embodiment of the disposable add-on module of the invention wherein changing the capping means and/or the wiping means between an operative position and a non-operative position is effected by movement of the disposable printer cartridge with reference to the frame of the add-on module. The benefits of this feature can be suitably achieved by providing the printer with a rail, and arranging that the actuator comprises an actuator arm which is connectable to the disposable printer cartridge, wherein the actuator arm is movable along the rail in the printer.

Corresponding with the just mentioned aspects of the printer, the add-on module preferably has the feature that the capping means and/or the wiping means are movably mounted on the frame of the add-on module.

Preferably the doors for the capping means and/or the wiping means are connected with a first hinge and a second hinge respectively to the frame of the disposable add-on module.

It is further preferred that the first hinge and/or the second hinge are spring-loaded.

With the features of the movable mounting of the capping means and/or the wiping means in the frame of the add-on module, and in particular by the placement of these capping means and wiping means on the hinging doors, moving the disposable printer cartridge in the frame of the add-on module from a resting position to its printing position will cause that the printer cartridge will first place the capping means in a non-operative position, and second that the wiping means will become operative for cleaning the inkjet nozzles before the actual printing starts. Conversely when after printing the printer cartridge is retracted in the frame of the add-on module from its printing position back to its resting position, the disposable printer cartridge will first let the wiping means return to a ready state for a subsequent wiping operation, and second it will cause the capping means to become operative for closing off the inkjet nozzles of the disposable printer cartridge. The returning of the wiping means to its ready state and the capping means assuming again their operative position is assisted by the spring-loaded doors on which these respective means are mounted.

It is further preferable that the wiping means comprise a bulge which is provided on the concerning door distant from its hinge with the frame. When the disposable printer cartridge moves in the frame of the add-on module and opens the door that is provided with the wiping means, said bulge provides an effective cleaning of the inkjet nozzles of the disposable printer cartridge.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

Whenever in the figures the same reference numerals are applied, these numerals refer to the same parts.

DETAILED DESCRIPTION OF THE INVENTION

Figure 1A:
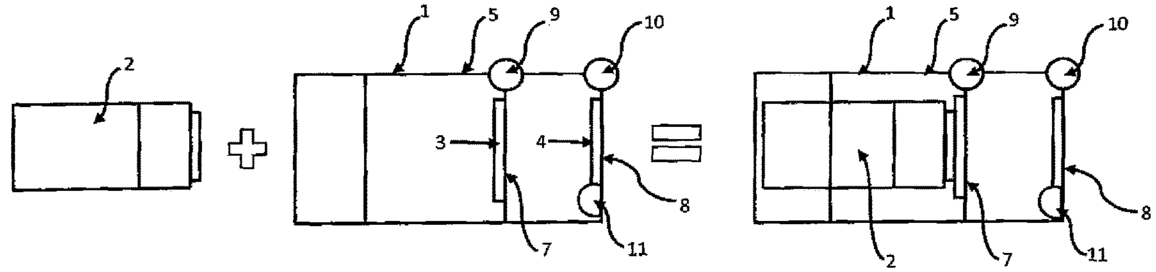
FIGS. 1A and 1B show in top view and side view respectively a disposable add-on module according to an embodiment of the present invention in combination with a disposable printer cartridge.
Figure 1B:
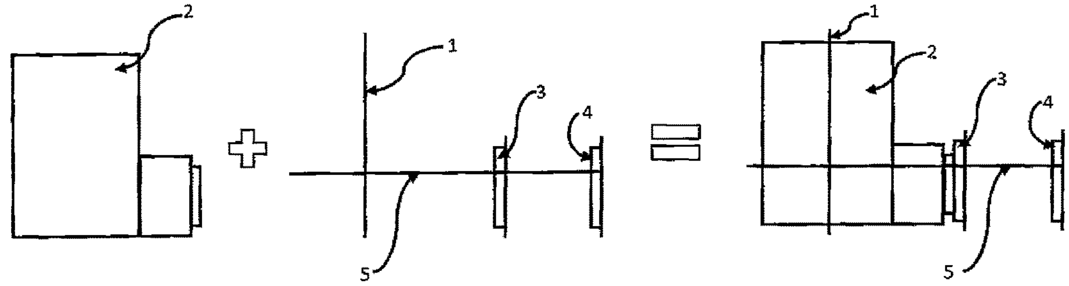

Making first reference to FIGS. 1A and 1B, it shows a disposable add-on module 1 for a disposable printer cartridge 2. In known way the disposable printer cartridge 2 is provided with inkjet nozzles. The nozzles are not further shown in the drawing since this is perfectly clear for the skilled person. Moreover the inkjet nozzles do not form part of the invention. The disposable add-on module 1 comprises capping means 3 and/or wiping means 4, and preferably both capping means 3 and wiping means 4, hat are arranged for capping and/or wiping respectively of said inkjet nozzles of the disposable printer cartridge 2.

The FIGS. 1A and 1B show that the disposable add-on module 1 comprises a frame 5 which is capable to receive the printer cartridge 2.

FIGS. 1A and 1B further show that the capping means 3 and/or the wiping means 4 are movably mounted on the frame 5 of the disposable add-on module 1, in particular by arranging that the capping means 3 and/or the wiping means 4 are provided on movable doors 7, 8 that are mounted on the frame 5. The doors 7, 8 supporting the capping means 3 and/or the wiping means 4 are connected with a first hinge 9 and a second hinge 10 respectively to the frame 5 of the add-on module 1. Preferably the first hinge 9 and/or the second hinge 10 are spring-loaded.

In the right-hand part of FIGS. 1A and 1B it is shown that the capping means 3 are operative for capping the inkjet nozzles of the disposable printer cartridge 2. The wiping means 4 are in a ready state for a later wiping operation on the inkjet nozzles of the printer cartridge 2 as will be explained hereinafter.

It is remarked that for appropriate operation the capping means 3 comprise a nozzle seal, preferably a silicone cap, mounted on the door 7 supporting the capping means 3. And further that the wiping means 4 comprise a waste ink collector, preferably a sponge, mounted on the door 8 supporting the wiping means. It is further noteworthy that the wiping means 4 comprise a bulge 11 which is provided on the concerning door 8 distant from its hinge 10 with the frame 5 of the add-on module 1.

Figure 2A:
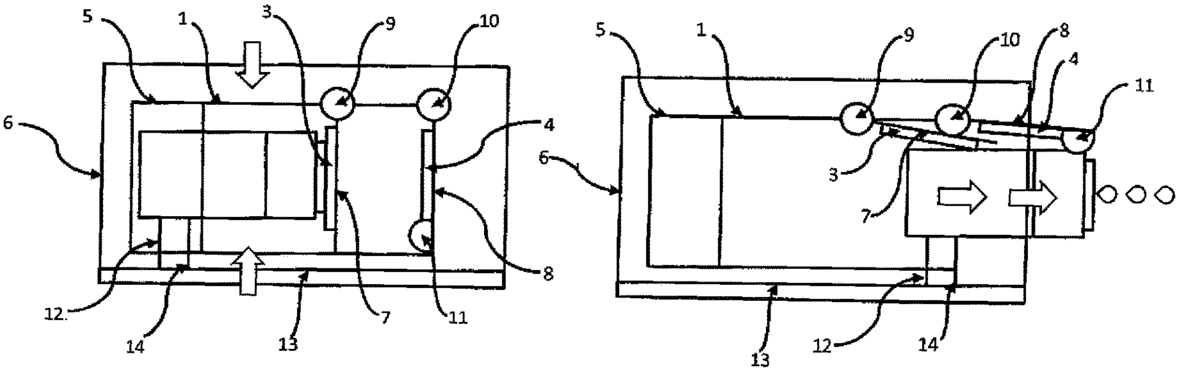
FIGS. 2A and 2B show in top view and side view respectively a disposable add-on module according to an embodiment of the present invention in combination with a disposable printer cartridge as an assembly mounted and operational in a printer according to an embodiment of the present invention.
Figure 2B:
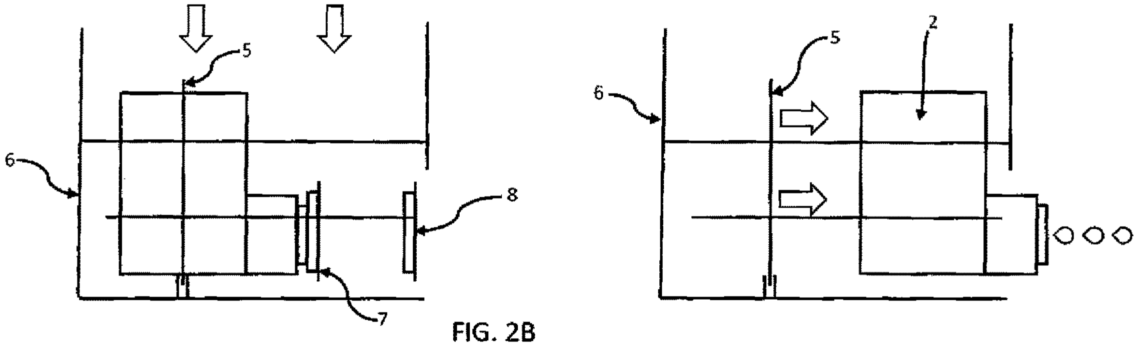

FIGS. 2A and 2B show that the assembly of the disposable add-on module 1 and the disposable printer cartridge 2 is placed in a printer 6. Comparing the left-hand part with the right-hand part of FIGS. 2A and 2B shows that when the disposable add-on module 1 is assembled together with the disposable printer cartridge 2, the frame 5 of the add-on module 1 leaves room for reciprocating movement of the printer cartridge 2 in the frame 5. In connection therewith it is shown that the printer 6 has an actuator 12 operative on the printer cartridge 2 for moving the printer cartridge 2 in the frame 5 of the add-on module 1. The printer further comprises a rail 13, and the actuator 12 comprises an actuator arm 14 which is connectable to the printer cartridge 2, wherein the actuator arm 14 is movable along the rail 13 in the printer 6 and thus can move the printer cartridge 2 accordingly.

In the left-hand part of FIGS. 2A and 2B the printer cartridge 2 is in its resting position wherein the capping means 3 close off the inkjet nozzles of the printer cartridge 2. When the printer cartridge 2 moves from said resting position to its printing position as depicted in the right-hand part of FIGS. 2A and 2B, this causes that the printer cartridge 2 will first place the capping means 3 in a non-operative position, and second that the wiping means 4 will become operative for cleaning the inkjet nozzles before the actual printing starts.

Conversely when after printing the printer cartridge 2 is retracted in the frame 5 of the add-on module 1 from its printing position in the right-hand part of FIGS. 2A/2B back to its resting position in the left-hand part of FIGS. 2A/2B, the printer cartridge 2 will first let the wiping means 4 return to a ready state for a subsequent wiping operation, and second it will cause the capping means 3 to become operative for closing off the inkjet nozzles of the printer cartridge 2. Both the returning of the wiping means 4 to its ready state and the capping means 3 assuming their operative position is assisted by the spring-loaded doors 7, 8 on which these respective means are mounted. Accordingly, the FIGS. 2A/2B demonstrate that changing the capping means 3 and/or the wiping means 4 between an operative position and a non-operative position is effected by movement of the disposable printer cartridge 2 with reference to the frame 5 of the disposable add-on module 1.

Although the invention has been discussed in the foregoing with reference to an exemplary embodiment of the printer cartridge and the add-on module and printer of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. An add-on module to a printer, the add-on module comprising:

a disposable frame suitable to receive and hold a disposable printer cartridge comprising inkjet nozzles, which disposable printer cartridge is equipped for placement within the disposable frame and the disposable frame, together with the disposable printer cartridge received in the disposable frame, equipped for placement in the printer; and capping means disposed on a first door mounted on the disposable frame, the first door opens to permit access for the printer cartridge to pass through an opening, the capping means arranged for capping the inkjet nozzles of the printer cartridge, and wherein the capping means comprise a nozzle seal comprising a cap, mounted on the first door.

2. The add-on module according to claim 1, wherein the disposable frame of the add-on module is capable of receiving the disposable printer cartridge.

3. The add-on module according to claim 1, as assembled together with the disposable printer cartridge, wherein the disposable frame leaves room for reciprocating movement of the disposable printer cartridge in the disposable frame.

4. The add-on module according to claim 1, wherein the capping means is movably mounted on the disposable frame.

5. The add-on module according to claim 1, wherein the first door is connected with a first hinge to the disposable frame.

6. The add-on module according to claim 5, wherein the first hinge is spring-loaded.

7. The add-on module according to claim 1, wherein capping means can be changed between an operative position and a non-operative position which positions are effected by movement of the disposable printer cartridge with reference to the disposable frame.

8. The add-on module according to claim 1, further comprising wiping means and further comprising a second door.

9. The add-on module according to claim 8, wherein the wiping means comprise a waste ink collector, the wiping means comprising a sponge mounted on the second door.

10. The add-on module according to claim 8, further comprising a hinge on the second door, wherein the wiping means comprises a bulge which is provided on the second door, the bulge disposed distant from the hinge of the second door with the disposable frame.

11. The add-on module according to claim 8 wherein the add-on module can be placed into a printing configuration wherein the capping means is in a non-operative configuration and the wiping means has cleaned off the inkjet nozzles of the printer cartridge.

12. A printer equipped to receive a disposable printer cartridge that is provided with inkjet nozzles, wherein the printer is further equipped to receive and house an assembly comprising the disposable frame and the disposable printer cartridge of the add-on module according to claim 1.

13. A printer according to claim 12, wherein the printer has an actuator operative on the disposable printer cartridge for moving the disposable printer cartridge in the disposable frame of the add-on module.

14. A printer according to claim 13, wherein the printer comprises a rail, and the actuator comprises an actuator arm which is connectable to the disposable printer cartridge, wherein the actuator arm is movable along the rail in the printer.

15. The add-on module according to claim 1 wherein the add-on module can be placed into a resting configuration wherein the capping means on the first door close off the inkjet nozzles of the printer cartridge.

16. The add-on module according to claim 1 wherein the add-on module is disposable.

17. The add-on module according to claim 1 wherein the add-on module is independent from the printer and does not form a constructional part of the printer.

* * * * *